United States Patent [19]

Fredley

[11] Patent Number: 4,869,313
[45] Date of Patent: Sep. 26, 1989

[54] LOW PRESSURE DROP CONDENSER/EVAPORATOR PUMP HEAT EXCHANGER

[75] Inventor: Joseph E. Fredley, Northhampton Township, Bucks County, Pa.

[73] Assignee: General Electric Company, East Windsor, N.J.

[21] Appl. No.: 219,119

[22] Filed: Jul. 15, 1988

[51] Int. Cl.$^4$ .......................... F28D 15/02; F28B 1/02
[52] U.S. Cl. ................................. 165/41; 165/104.14; 165/104.26; 165/110; 165/156
[58] Field of Search ............ 165/41, 110, 156, 104.14, 165/104.26

[56] References Cited

U.S. PATENT DOCUMENTS 4,286,653  9/1981  Edwards ............................. 165/156
4,333,525  6/1982  Ilbin et al. ........................... 165/156

FOREIGN PATENT DOCUMENTS 2708377  8/1978  Fed. Rep. of Germany ...... 165/156
1183757  2/1959  France ................................. 165/156

OTHER PUBLICATIONS

"Capillary Pumpted Loop (CPL) Technology Workshop", published by Aerospace Corporation, dated Jan. 21-22, 1986.

Primary Examiner—Albert W. Davis, Jr.
Attorney, Agent, or Firm—Clement A. Berard, Jr.; William H. Meise

[57] ABSTRACT

A heat exchanger includes a porous cylindrical sleeve with a bore into which liquid coolant is admitted. The liquid permeates the sleeve but cannot leave the outer surface. A pipe surrounds the sleeve. The pipe has a cylindrical outer surface and an inner surface defining protrusions and vapor channels about the protrusions. The inner ends of the protrusions bear against the outer surface of the sleeve. A plurality of helical channels are helically arranged about and in thermal contact with the outer surface of the pipe. The ends of the helical channels are coupled to plenums. Each plenum is coupled by a pipe and a fluid disconnect to one end of a thermal loop including a heat source. Heat-laden vapor passes through the helical channels and is cooled to liquid. The heat is withdrawn into the pipe and passes through the protuberances to vaporize the liquid near the surface of the porous sleeve. The resulting vapor is collected and coupled to a condenser.

11 Claims, 7 Drawing Sheets

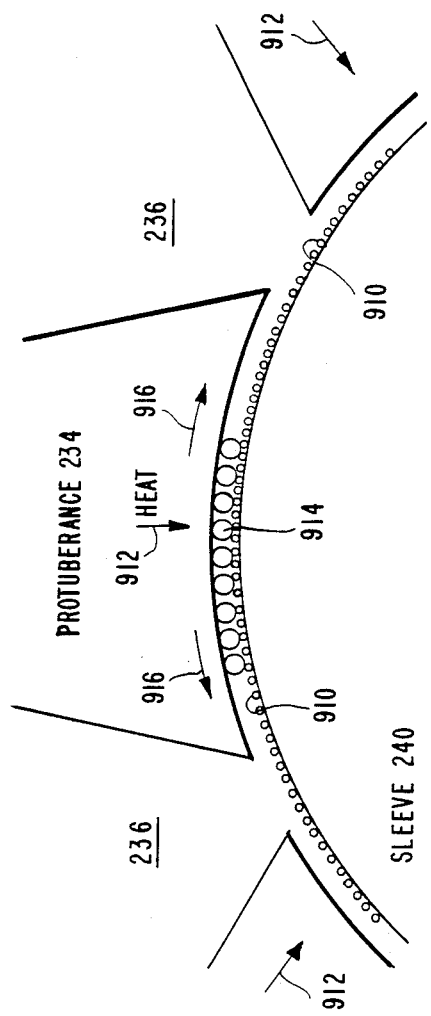

LOW PRESSURE DROP CONDENSER/EVAPORATOR PUMP HEAT EXCHANGER

This invention relates to heat exchangers and, more particularly, to heat exchangers using capillary evaporator pumps in a microgravity environment.

Future spacecraft will use higher power in their operating systems, and will consequently require more heat dissipation capability, and will have more stringent heat transfer requirements than current spacecraft. Compliance with these requirements necessitates development of thermal control techniques with capabilities far exceeding those in current use. A fundamental requirement is a heat acquisition, transport and rejection system capable of simultaneously accommodating large heat loads, high heat density sources, long transport distances and varying operational parameters. The heat loads and the heat flux densities which are expected in the future will be on the order of a magnitude greater than those used in current spacecraft. A desirable type of system is that type which uses a two phase thermal control system. Two phase means that type of thermal control system in which a heat transfer fluid enters a condenser in the form of vapor and exits, after condensation, in the form of a liquid.

Economic considerations require that the mission life of spacecraft exceed ten years. Spacecraft designs are therefore evolving which permit servicing of defective parts, addition of growth segments, and/or replacement of spent or obsolete hardware. These enhanced operational features can best be accommodated by modularized spacecraft. Modularized design presents a new set of design considerations and challenges to the thermal control subsystems designer.

Modular designs require connectable/disconnectable devices through which thermal energy may be transported. Also, in a modular spacecraft the thermal control subsystem must be adapted to mechanical configuration changes and additional or changed heat loads. In particular, the heat produced in one module may need to be transported to a rejection panel located on another module some considerable distance away.

It is advantageous in designing heat exchangers and other portions of thermal control subsystems, to select not only those that will work and are practical in a zero gravity or microgravity environment, but which in addition can be tested in a an Earth gravity environment and work in approximately the same manner in a microgravity environment.

In the prior art it is known to provide mechanically-pumped systems in which cooled liquid is piped from a condenser over a supply line to cold plates, at which the liquid absorbs heat and evaporates. The art includes mechanically-pumped loops, capillary-pumped loops and hybrids of mechanically pumped and capillary loops. It is also desirable in some cases to avoid the use of a mechanical pump in order to circulate the liquid. The capillary pump system is advantageous because it requires no moving parts, but it has the disadvantage that it generates a pressure potential or head of only about one-half pound per square inch ($\frac{1}{2}$ PSI) (which is about 3200 N/m$^2$) and this requires a system in which the system components, and in particular the condenser or condensers, have very low pressure drop.

Heat pipes are closed elongated pipes which include a capillary wick which extends from one end of the pipe to the other end, and which transport heat by capillary action of the wick on a liquid component of the working fluid. U.S. patent application Ser. No. 111,338, filed Oct. 22, 1987 in the name of the inventor herein describes a heat exchanger including a plurality of condenser tubes helically arranged about and thermally coupled to a heat pipe. The condenser tubes are adapted to receive working fluid vapor at one end and to transfer heat to the heat pipe to produce liquid at the other end of the condenser tubes.

When the heat transfer requirements are large, or working fluid is to be transported over relatively long distances, the heat pipe may not be advantageous because the wick must extend the length of the system, and because the heat transfer capacity is limited to that permitted by the maximum rate of flow of liquid phase fluid through the wick.

SUMMARY OF THE INVENTION

A thermally conductive housing with a cylindrical outer surface has an inner surface defining projections and vapor fluid channels. The projections bear at their inner surfaces upon a porous pipe capped at one end. The vapor channels couple to a plenum. A plurality of peripheral channels wrap helically about, and in thermal contact with, the outer surface of the housing. Heat-laden vapor applied through the helical channels couples heat to the housing and condenses the vapor to a liquid which can be returned to a source of heat. The heat is coupled through the projections to the surface of the porous pipe. Working liquid flows into the pipe and perfuses the pores. The hot projections vaporize the working liquids, thereby forming vapor which flows into the channels defined by the housing. The heat-laden vaporized working fluid is collected and is available for return to a condenser.

DESCRIPTION OF THE DRAWING

FIG. 8b is a section of the condenser thereof taken in the plane of the FIG. 8a;

FIG. 9 is a cartoon illustrating how heat vaporizes the liquid perfusing the porous sleeve.

DESCRIPTION OF THE INVENTION

Figure 1:
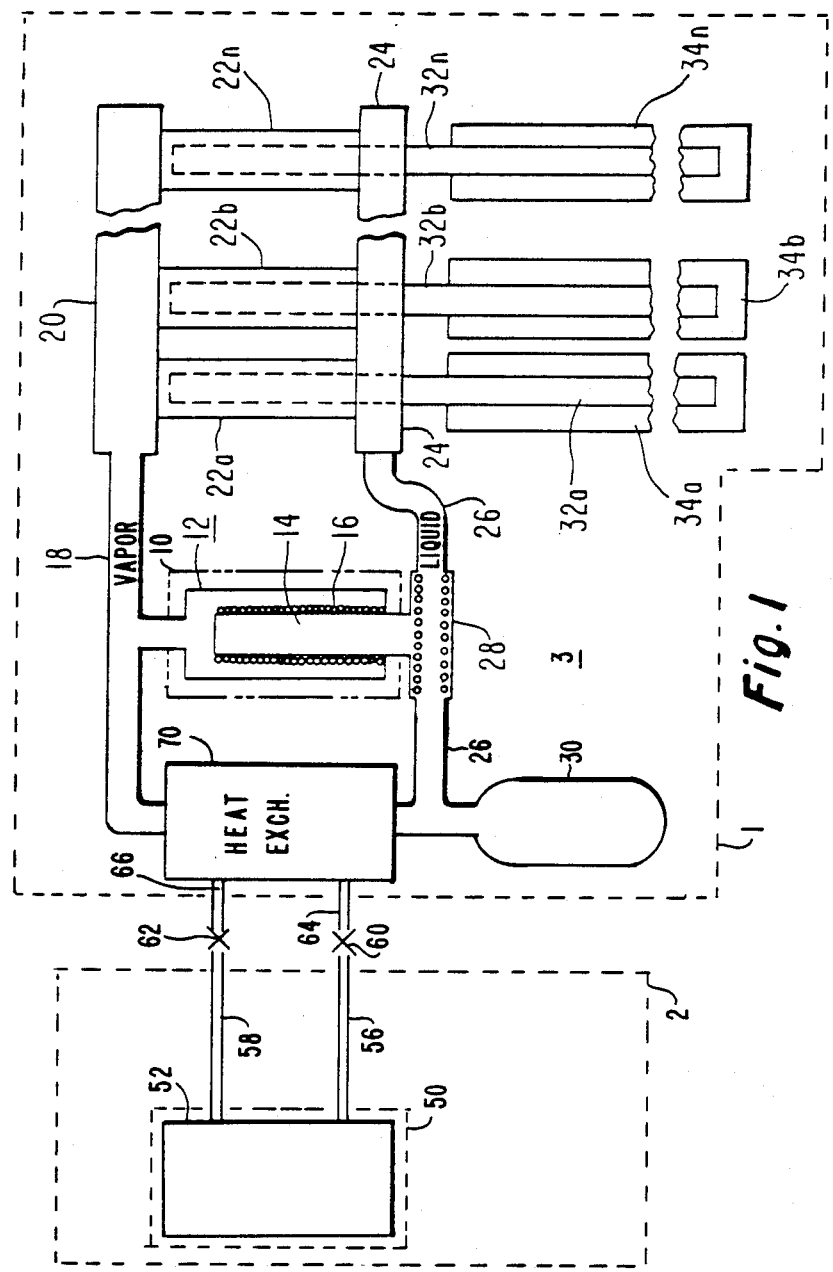
FIG. 1 illustrates the thermal elements of a modular spacecraft in simplified schematic form.

FIG. 1 is a system block diagram of a thermal control apparatus embodying the invention. In FIG. 1, thermal control system 3 includes a heat generating portion 10 of a spacecraft module, designated as 1, which may include electronic packaging and amplifiers and other heat generating sources. Thermally coupled to heat generating portion 10 is a wicked evaporator or capillary pump 12 including a housing with a liquid channel 14 communicating with a wick 16. Heat from source 10 causes working fluid in liquid from (coolant) in channel 14 to flow into wick 16 and to be evaporated to form a coolant vapor. The coolant vapor flows from evaporator 12 through a vapor pipe 18 to a plenum or manifold 20. Manifold 20 distributes the heat-laden coolant vapor among a plurality of condensers 22a, 22b . . . 22n. Vapor pipe 18 and manifold 20 of a capillary pumped loop should be insulated to avoid loss of heat, which might result in condensation of coolant vapor to the liquid form before distribution of the vapor among the condensers by manifold 20, which in turn might cause liquid to be distributed preferentially to some of the condensers and thereby cause system imbalance. The coolant vapor is condensed in condensers 22 to a sub-cooled liquid, which is collected in a liquid plenum 24. The liquid coolant is returned to evaporator 12 by a return pipe 26 and through a wicked isolator 28, which prevents any heat pipe vapor from entering liquid channel 14 and depriming the system. A coolant reservoir 30 is connected to isolator 28 and liquid pipe 26 for system pressure and fluid inventory control.

As described below, each of condensers 22a, 22b . . . 22n includes a heat exchanger coupled to a heat pipe for carrying away latent and sensible heat derived from the coolant fluid, and a radiator panel or panels coupled to an end of the heat pipe for rejecting the heat by radiation into space. In FIG. 1, condenser 22a is coupled to a heat pipe 32a, condenser 22b is connected to a heat pipe 32b, etc. Such heat pipes transport heat from an evaporator section to a condenser section of the heat pipe, while maintaining a substantially constant temperature across the length of the heat pipe. The end of heat pipe 32a remote from condenser 22a is connected to a radiator panel 34a, and the remaining heat pipes 32b . . . 32n are each associated with a corresponding radiator panel 34.

FIG. 1 also illustrates a second spacecraft module 2 includes heat generating portions 50 coupled to a further wicked evaporator or capillary pump 52 similar to wicked evaporator 12. Wicked evaporator 52 cools generating portion 50 by receiving liquid coolant over a pipe 56 and vaporizing the coolant to form vapor, which is taken away by a pipe 58.

Spacecraft module 2 as illustrated does not include its own heat rejection apparatus, or if it does include an on-board heat rejection arrangement, the heat generates when module 2 is in operation exceeds the capability of the on-board arrangement. Consequently, the heat-laden vapor led away from evaporator 52 must be condensed in an outboard apparatus. Pipes 56 and 58 terminate in self-sealing fluid disconnect pairs 60 and 62, respectively. Each disconnect part includes one half of a mating connector attached to each of two pipes being mated. Such disconnects are well known and may be of any conventional type, such as type RSO manufactured by Moog Corp., the address of which is East Auroro, New York, 14052. When the spacecraft modules are mated, disconnect pairs 60 and 62 couple pipes 56 and 58 to pipes 64 and 66, respectively, which are mounted on spacecraft module 1.

Pipes 64 and 66 couple cooled liquid working fluid or coolant from, and heat-laden vapor to, a heat exchanger 70. Heat exchanger 70 cools the vapor received from pipe 66 to generate the liquid which is returned to module 2 by way of pipe 64. The heat so extracted is used to vaporize liquid working fluid or coolant received by way of pipe 26 to thereby produce vapor which is coupled to pipe 18, where the vapor joins that produced by evaporator 12 and flows to plenum 20 and condensers 22. The heat generated on both modules 1 and 2 is rejected by condensers 22.

Heat pipes, which are closed pipes of thermally conductive material including a wick which is in thermal contact with the conductive walls, may be used to couple heat from one location to another. The heat-carrying capacity of a heat pipe is limited by the rate at which coolant liquid can return from the cold end through the wick by capillary action. In general, a pipe of given diameter can carry more heat if it is filled with a pumped liquid than if it must contain a flow-restricting wick and space for return of vapor. Where long distances are involved or the piping must make convoluted bends, the wick of a heat pipe represents additional weight and assembly problems. Simple pipes connected in a pumped loop may therefore be better than heat pipes for high heat density and long heat transport distances.

As known, present capillary pumped loops using ammonia generate a pressure potential of approximately ½ PSI. This relatively small pressure potential must support sufficient coolant flow in the capillary pumped loop to carry the heat produced by heat sources 10 on 50. It is therefore imperative that the elements of the loop such as the pipes and condenser have a very low pressure drop at the desired coolant flow rate. The pipes providing flow of fluid may be provided with smooth interior walls, and may be made large enough to provide very low pressure drop. It is also important that the condenser have a low pressure drop.

Heat exchanger 70 must also have a low pressure drop for the working fluid exchanged between pipes 64 and 66, because the fluid is pumped by capillary pump 52. It must further generate sufficient pressure to pump working fluid from pipe 26 to pipe 18, but should not "short-circuit" wicked evaporator 12 during those times when spacecraft module 2 is disconnected. In this context, the term short-circuit means allowing the flow of fluid between pipes 18 and 26, as would happen with a simple straight-through connection.

Figure 2A:
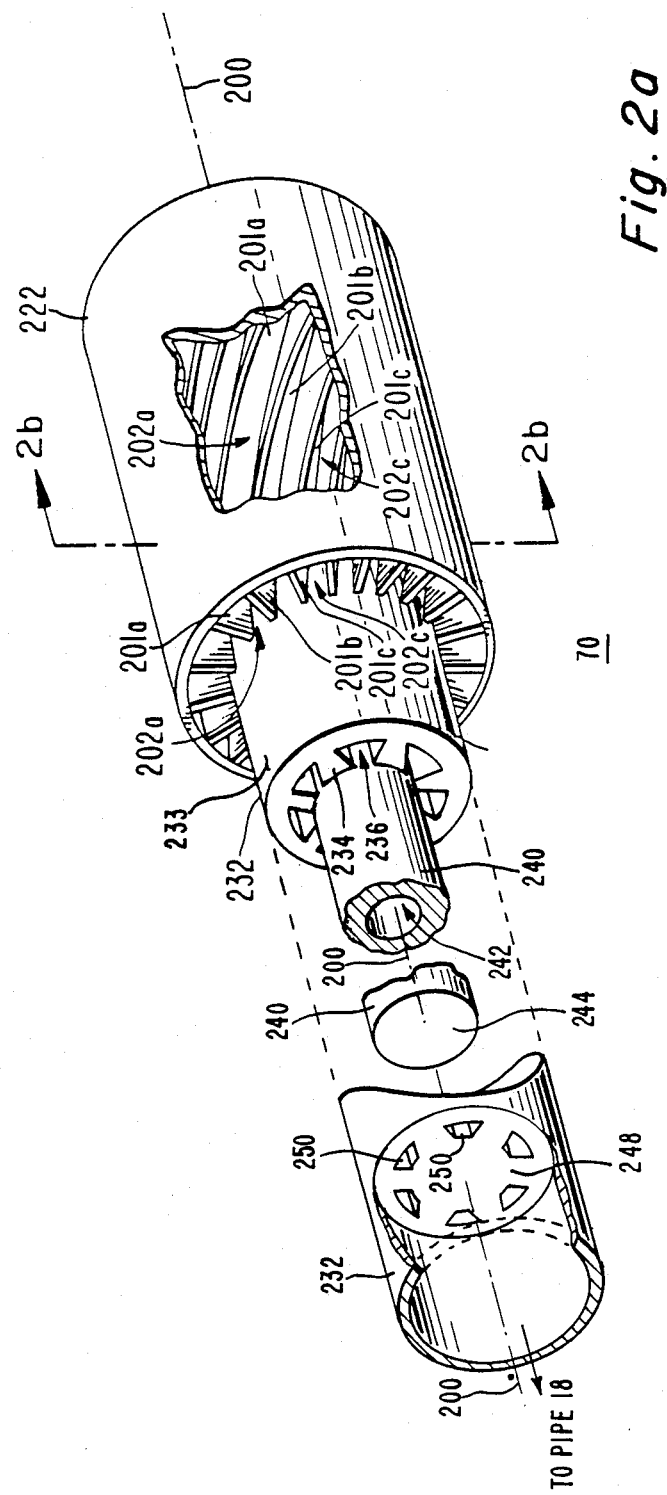
FIGS. 2a and 2b, referred to together as FIG. 2, are cut-away perspective or isometric views and cross-sectional views, respectively, of a heat exchanger according to the invention which is adapted for use in the arrangement of FIG. 1.

FIG. 2a illustrates, in perspective or isometric view, and partially cut away and exploded, a portion of heat exchanger 70 of FIG. 1. The illustrated portion of heat exchanger 70 includes a thermally conductive pipe 232 having a cylindrical outer surface 233 centered on an axis 200 and an inner surface defining protrusions or protuberances 234 and vapor channels 236, which can more easily be seen in FIG. 2b. Channels 236 are longitudinal (parallel to axis 200) and mutually parallel. The innermost surfaces of protrusions 234 are curved and bear against the cylindrical outer surface of a porous sleeve 240. Porous sleeve 240 defines a bore 242 which extends to an end wall 244 which closes off the bore and terminates porous sleeve 240. End wall 244 of porous sleeve 240 bears against an inner wall 248 which closes off pipe 232, except for apertures 250 opening into vapor channels 236.

Bore 242 of porous sleeve 240 is coupled at its open end (the far end in FIG. 2a) to pipe 26 of FIG. 1 for receiving liquid coolant therefrom. The liquid coolant fills bore 242, and permeates or perfuses the porous structure due to surface tension effects. However, without the application of heat, the surface tension effects prevent liquid coolant from leaving the outer surface of porous sleeve 240 to enter vapor channels 236.

Figure 2B:
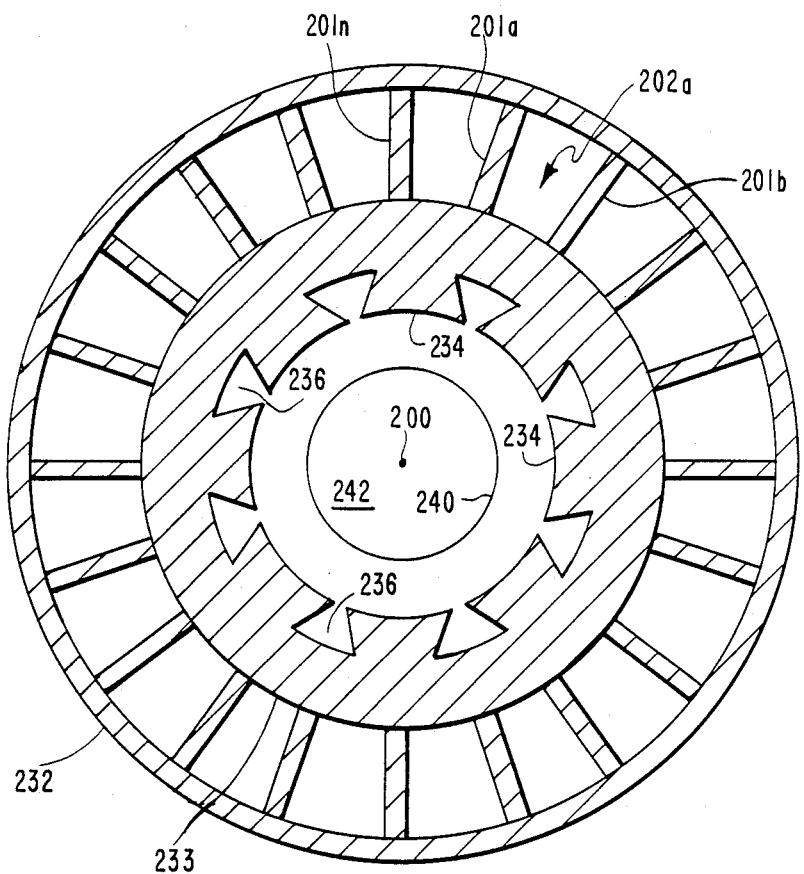

Heat exchanger 70 includes a cylindrical outer housing 222 spaced from outer surface 233 of pipe 232 and centered on axis 200. The region between outer housing 222 of heat exchanger 70 and the outer surface 233 of pipe 232 is occupied by a plurality of mutually parallel fins, septa or vanes, designated as 201. Vanes 201 are relatively thin, and are oriented with their major flat surfaces parallel to radial lines passing orthogonally through common axis 200 of pipe 232 and housing 222. Thus, vanes 201 divide the region between outer housing 222 and the outer surface 233 of pipe 232 into a plurality of fluid channels 202. These fluid channels are roughly rectangular in shape, as illustrated in FIG. 2b and in FIGS. 3–7. The fluid channels 202 defined by vanes 201, housing 222 and outer surface 232 are dimensioned so that the surface tension forces of a liquid coolant which wets the walls is at least significant compared with the force of gravity acting upon the coolant liquid in a one-gravity (1 G) environment, i.e. in the ordinary gravity at the surface of the earth. The average diameter or side of a fluid channel is selected to be about 1/10 inch when the coolant fluid is ammonia ($NH_4$). With such a dimensioning, the surface tension forces are substantially equal to the 1 G gravitational forces, so that the form of the liquid flow of condensed coolant fluid through the channels tends to be similar both in a 1 G gravity and in a microgravity environment.

Fins or vanes 201 take a helical path about axis 200. That is, even though all fins or vanes are radial as illustrated in the cross section of FIG. 2b at all main cross-sections of heat exchanger 70 of the fluid channels such as fluid channel 202a are helically formed or spiral around the outside 233 of pipe 232.

Relatively thin vanes 201 represent a relatively small proportion of the total cross-sectional area of the region between outer housing 222 and wall 233. Consequently, fluid flow in an axial direction through the many parallel fluid paths occurs with a relatively low resistance to the fluid flow, and consequently with a relatively low pressure drop. The spiral path of the fluid channels imparts a "spinning" motion to the coolant fluid flowing therethrough, which results in a centrifugal force which tends to circulate liquid toward the portion of each fluid channel adjacent outer housing 222. This centrifugal force, together with the surface tension forces, tends to cause the flow of coolant fluid through channels 202 in a microgravity environment to be approximately the same as the flow of coolant fluid in a 1 G gravity environment, as explained in more detail below.

The near and far ends of fluid channels 202 are coupled into vapor and liquid plenums, not illustrated in FIG. 2 but which are represented in FIG. 8 by 820 and 826. The vapor plenum 820 receives vapor by way on pipe 58 and couples it to the near ends of all of the channels 202. At the far ends of the channels, the condensed liquid is collected by plenum 824 and is supplied by way of pipe 64 to pipe 56. In FIG. 8, the channel-defining vanes are designated 801a, 801n . . . 801p because there are clearly fewer in number than vanes 201 of FIG. 2, but they are otherwise identical.

Figure 3A:
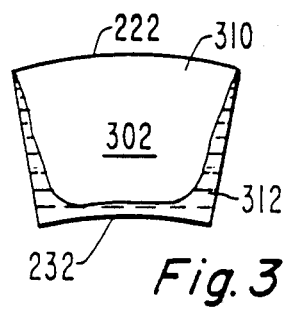
FIGS. 3a, b and c, referred to jointly as FIG. 3, represent the distribution of vapor and liquid coolant in a straight, nonhelical fluid channel of a heat exchanger similar to that of FIG. 2 at various positions along the fluid channel, in a micro-gravity environment.
Figure 3B:
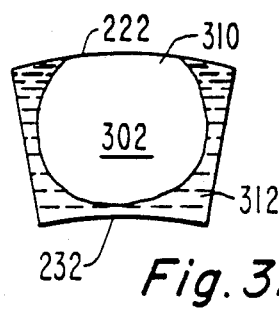

FIG. 3 represents various cross-sections of a fluid channel 302 similar to fluid channel 202 illustrated in FIG. 2, at various points between the vapor inlet side and the liquid outlet side, but for a straight-through, unspiraled or non-helically arranged passage. The vapor and liquid distributions of FIG. 3 represent those occurring in a microgravity environment. FIG. 3a illustrates a region of fluid channels 302 near the vapor manifold, in which a small amount of vapor 310 has condensed to form liquid 312. The condensation tends to occur on the surface 233 of the wall of pipe 232, which withdraws latent heat so the liquid tends to condense onto the surface of pipe 232. For purposes of explanation, pipe 232 is considered equivalent to the wall of a vane-supporting sleeve 1033 closely fitting around pipe 1032 as illustrated in FIG. 9. As illustrated in FIG. 3a, surface tension forces tend to draw the condensed liquid 312 part-way around the inner periphery of the fluid channel. FIG. 3b illustrates a condition farther along channel 302 representing the progression of the coolant fluid towards a more fully condensed state, in which a larger portion of the fluid has condensed into a liquid form. The surface of outer housing 222 is still warmer than the remaining walls, so that condensation preferentially takes place on the surface 233 of pipe 232 and on the side walls, and surface tension forces tend to reduce the peripheral surface of the vapor portion or to form the remaining vapor into a bubble-like shape.

Figure 3C:
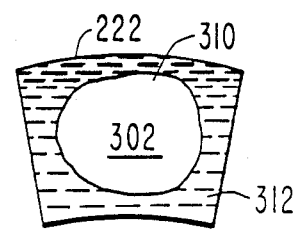

FIG. 3c illustrates a condition yet further along fluid channel 302, closer to the liquid outlet adjacent manifold 24 of FIG. 1. Surface tension forces have forced the vapor portion 310 to assume a tubular shape spaced from the walls of the channel, which in cross-section appears as a bubble. The vapor moves through the central, vapor-containing portion of channel 302 illustrated in FIGS. 3a, b, and c, and may generate waves in a longitudinal direction if the vapor flow rate is sufficient. When the height of the waves is sufficient to close off the remaining vapor channel, the flow becomes sectionalized, at the closed-off point appearing to be all-liquid in cross-sections such as those of FIG. 3, and at other points between closed-off points having the appearance of FIG. 3c. The sequential slugs of vapor are reduced in size as the coolant approaches the liquid outlet, and finally disappear. This generation of longitudinal waves in the liquid, and the resulting slugs of vapor, also occur in the flows illustrated in FIGS. 4–7, described below.

Figure 4A:
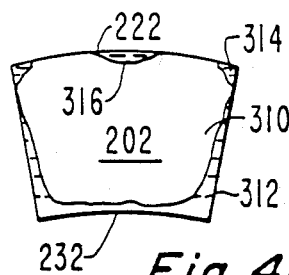
FIGS. 4a, b and c, referred to jointly as FIG. 4, represent the distribution of vapor and liquid coolant in a micro-gravity environment at various positions within a fluid channel helically disposed about a heat pipe as illustrated in FIG. 2.
Figure 4B:
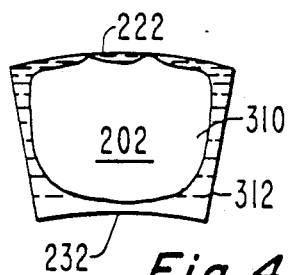
Figure 4C:
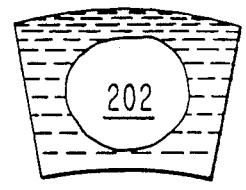

FIGS. 4a, 4b, and 4c illustrate the conditions within helically disposed fluid channel 202 as illustrated in FIGS. 2 under microgravity conditions. In FIG. 4a, in addition to the effects of surface tension in causing liquid to leave the lower surface 233 of pipe wall 232, the centrifugal forces imparted to the fluid cause a portion of the liquid to move to the corners and to the center of the surface of outer housing 222, as illustrated by liquid portions 314 and 316. At a location along the helical channel 202 where the condensation roughly corresponds to that of FIG. 3b, the effect of the helical disposition of fluid channel 202 is illustrated in FIG. 4b. As illustrated therein, centrifugal forces result in the appearance of liquid over almost the entirety of the inner surface of the fluid channel. FIG. 4c illustrates the effect of the helical disposition of the fluid channel at a more fully condensed condition, corresponding to that of FIG. 3c. The helical disposition makes almost no difference under these conditions, and the vapor is concentrated into the form of a tube (and appears as a circular bubble) in FIG. 4c. Waves can appear in the liquid and result in slugs of fluid and vapor, as described in conjunction with FIG. 3.

Figure 5A:
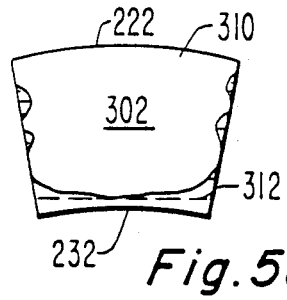
FIGS. 5a, b and c, referred to jointly as FIG. 5, represent vapor and liquid distribution within a portion of a straight fluid channel in a one-gravity (1 G) environment when the fluid channel is upright.
Figure 5B:
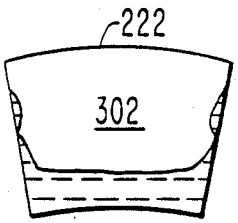
Figure 5C:
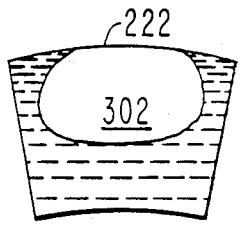

FIG. 5 represents the distribution of vapor and liquid coolant in a portion near the top of heat exchanger 70 of a channel 202 similar to channel 202 of FIG. 2, but which is straight rather than helical, and which is disposed in a one-gravity environment. The significance of its being a top portion can be understood by considering that in a microgravity environment, there is no "up" or "down", so FIGS. 3 and 4 apply to all portions of all fluid channels of the exchanger whereas in a 1 G environment, the force of gravity acts on a portion of a fluid channel which is on top of the condenser in a manner which is the inverse of the action on a portion which is on the bottom side of the exchanger. FIGS. 5a and 5b represent the distribution of liquid 312 and vapor 310 at locations relatively near the vapor plenum, where only a moderate amount of condensation has occurred. Gravitational forces tend to counteract the surface tension forces, so that relatively more liquid sits adjacent the bottom surface, which is surface 233 of pipe 232, than in FIGS. 3a and 3b representing the microgravity equivalent. In FIG. 5c, representing a cross-section of the straight channel nearer the liquid end of the heat exchanger, the remaining vapor forms a tube which appears in cross-section as a bubble, which rises to the top of the channel.

Figure 6A:
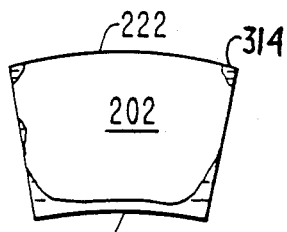
FIGS. 6a, b and c, referred to jointly as FIG. 6, represent the fluid distribution within an upright portion of a helically disposed fluid channel in a 1 G environment.
Figure 6B:
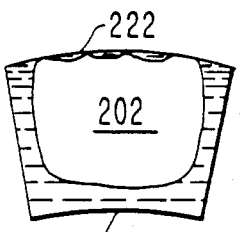
Figure 6C:
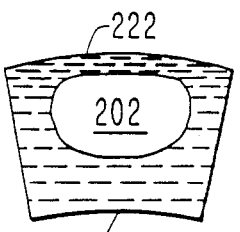

FIG. 6 represents the distribution of vapor 310 and liquid 312 in a helically disposed channel at the top of heat exchanger 70 in a 1 G environment. The helical path results in centrifugal force which tends to offset the effects of gravity on the liquid, so FIGS. 6a and 6b by comparison with the straight channel distributions of FIGS. 5a and 5b have more of the liquid climbing the walls. FIG. 6c has the vapor bubble which is more centrally located within the channel than in the case of FIG. 5c.

Figure 7A:
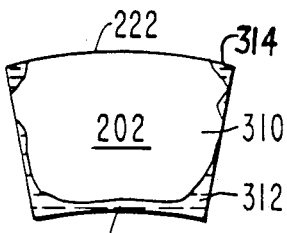
FIGS. 7a, b and c, referred to jointly as FIG. 7, represent the fluid distribution within an inverted portion of the helical fluid channel of FIG. 6 in a 1 G environment.
Figure 7B:
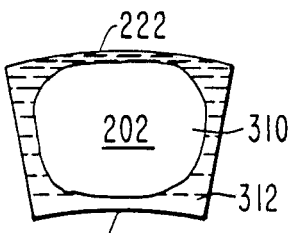
Figure 7C:
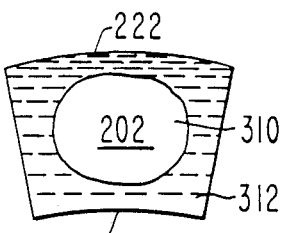

FIG. 7 represents the vapor and fluid distribution in a bottom portion of a helically disposed fluid channel in a 1 G environment. In this case, gravity aids the centrifugal forces, so the liquid in FIG. 7a climbs higher up the side walls of the fluid channels than in the case of FIG. 6a (helically disposed, top portion) and even puts some liquid, designated as 314, into corners of the channel. In FIG. 7b, both gravity and centrifugal forces aid in moving liquid against the surface of outer housing 222, thereby forming what amounts to a bubble of vapor centered in the fluid channel. This effect is more pronounced in FIG. 7c.

Comparing straight (non-helical channels in a microgravity environment (FIG. 3), with straight channels in a 1 G environment (FIG. 5), it can be seen that the fluid distributions are dissimilar over major portions of the condenser length. A comparison of the distributions of microgravity helically disposed channels (FIG. 4) with 1 G helically disposed top and bottom channels (FIGS. 6 and 7) shows a substantial resemblance at corresponding cross-sections. Thus, the heat flows for a heat exchanger such as 70 of FIG. 2 with helically disposed channels operating in microgravity should be similar to the heat flows under 1 G conditions, so testing can be accomplished on the ground before satellite launch.

Figure 8A:
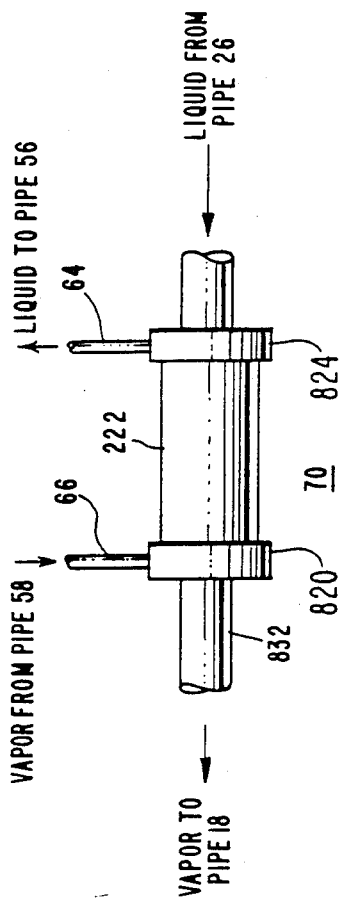
FIG. 8a is a view of another embodiment of a condenser.
Figure 8B:
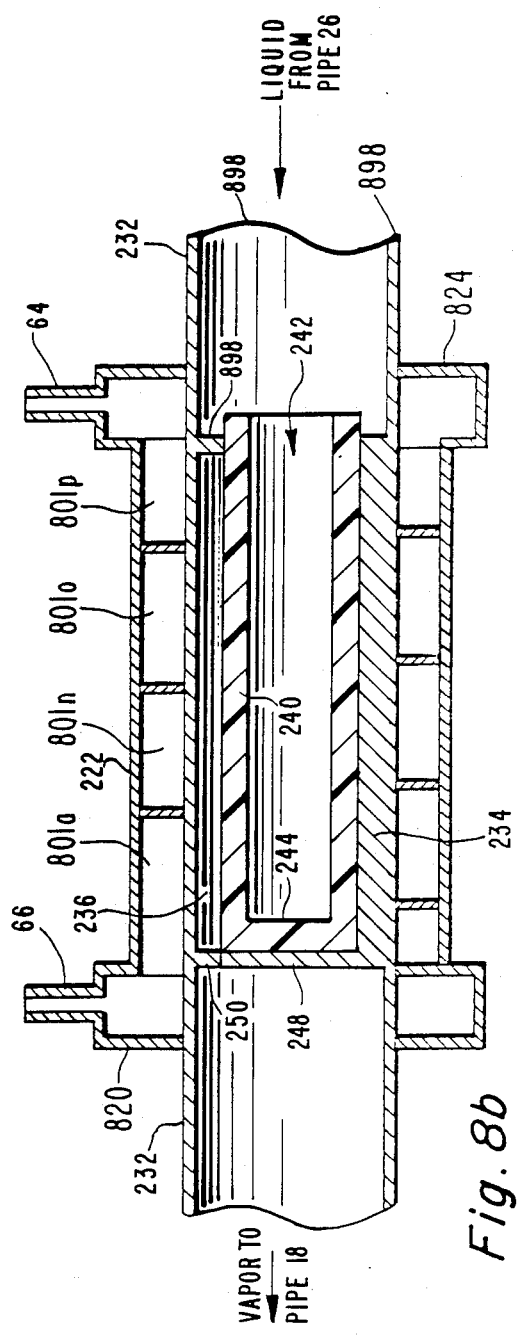

FIG. 8a illustrates an overall view of heat exchanger 70 including plenums 820 and 824. FIG. 8b is a cross-sectional view of heat exchanger 70, except that the fewer vanes are designated 801a, 801n, 801o and 801p rather than 210a–n as in FIG. 2. In FIG. 8b, it can be seen that liquid working fluid flowing to the left from pipe 26 enters port or bore 242 of sleeve 240, but cannot enter vapor channel 236 because of a wall 898 which closes off the right end of vapor channel 236. All the vapor channels are similarly closed off at their right ends. The liquid working fluid can pass through bore 242 to end wall 244, but no farther. The liquid permeates porous sleeve 240, as mentioned above, but cannot leave the outer surfaces of sleeve 240.

FIG. 9 illustrates pictorially or in cartoon fashion the mode by which heat is transferred from projections or protuberances 234 to the liquid permeating porous sleeve 240. As illustrated in FIG. 9, molecules of working liquid which permeate sleeve 240 extend above the porous surface, as suggested by small circles 910. Heat flows from the outside of pipe 232 (not illustrated in FIG. 9) toward the inner end of protuberance 234, as illustrated by arrow 912. At some points, protuberances 234 will be in contact with molecules 910, and heat will be transferred to the molecules, thereby placing them in vapor form. When this occurs near the center of a protuberance, the vaporized molecules will collect as bubbles, illustrated as large circles 914. The bubbles are guaranteed to be in contact with protuberance 234, so will not condense. As more bubbles are generated near the center of the protuberance-sleeve contact, the first-generated bubbles are forced in the direction of arrows 916 along toward vapor channels 236.

The arrangement of FIG. 1 including a heat exchanger 70 as illustrated in FIGS. 2 and 8 provides a low pressure drop path for the flow of working fluid or coolant from pipe 58 to pipe 56, whereby a good mass flow can be expected by the use of one or more wicked evaporators associated with the sources of heat. Furthermore, heat exchanger 70 when not energized or loaded with heat, as when module 2 is not attached to module 1, does not permit flow between liquid pipe 26 and vapor pipe 18. In effect, when not in operation heat exchanger 70 is an open circuit as to wicked evaporator 12. Under abnormal operating condition mating fluid disconnect pairs 60 and 64 may leak. The separation of the two working fluid paths in heat exchanger 70 prevents loss of fluid from the thermal loop on module 1 in the event of such a leak.

A condenser with a heat transfer pipe diameter of 0.6 inch (15 mm), 11 fluid channels with sides or diameters of about 1/10 inch (2.5 mm), and a length of each channel of about 41 inches (1050 mm), which make about 10 turns on an average diameter of about 0.8 inch, for use with ammonia has a pressure drop of about 0.04 PSI (280 N/m$^2$), and transfers about 0.45 kw at a flow rate of about 0.25 lbm/hr in each fluid channel with a temperature drop; of 5° C. between the condensing fluid and the heat pipe fluid.

Figure 10:
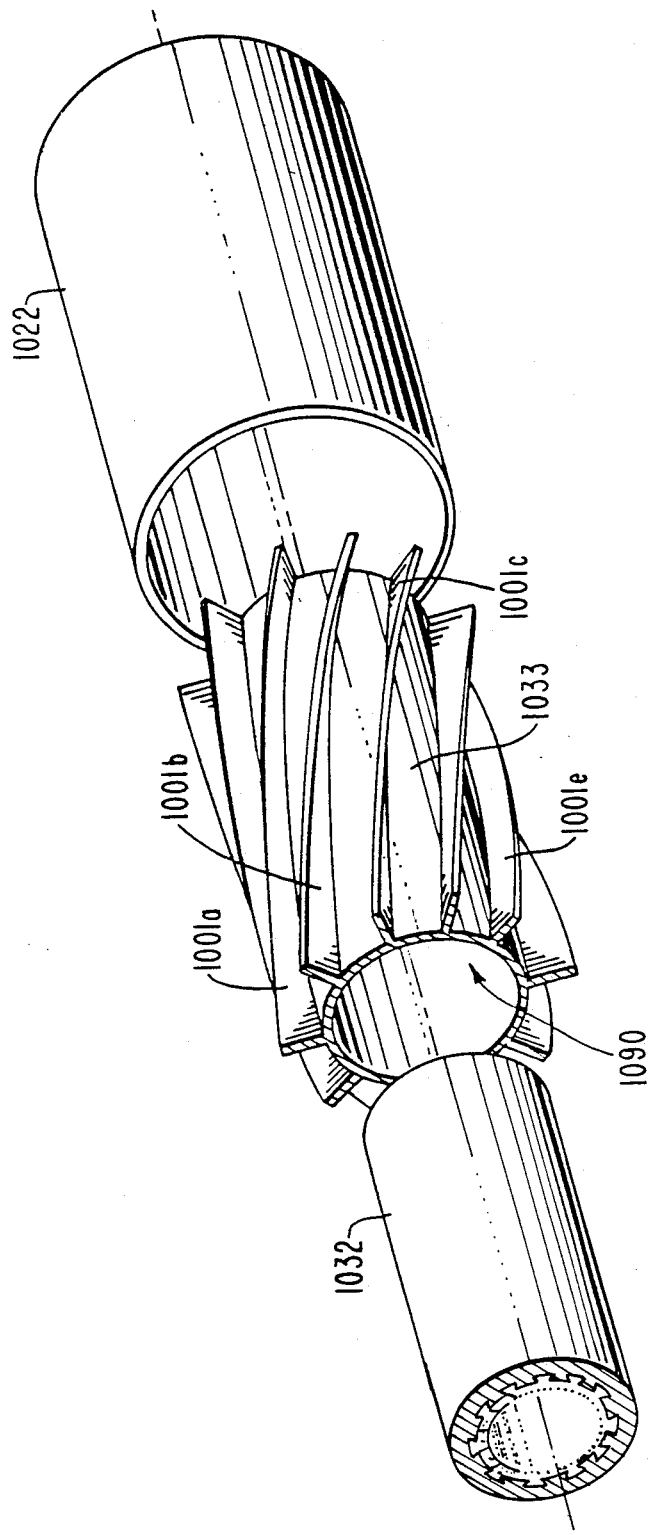
FIG. 10 illustrates an exploded perspective or isometric view of another embodiment of a heat exchanger according to the invention.

FIG. 10 illustrates another arrangement of the invention in which vanes 1001a, 1001b . . . are machined from a monolithic block and integral with a vane-supporting sleeve 1033. The interior diameter of a bore 1090 within vane-supporting sleeve 1033 is dimensioned to cause sleeve 1033 to fit tightly around the outer wall of a pipe 1032, interior details of which are not illustrated. Sleeve 1033 and associated vanes 1001 may be press-fitted onto pipe 1032, as by heating vane-supporting sleeve 1033 during the press-fitting. An outer wall 1022 in the form of a simple sleeve is dimensioned to fit closely over the exterior of vanes 1001. Such a structure is equivalent to the structure illustrated in FIG. 2, and operation is the same, except that the inner wall of each fluid channel is constituted by a portion of the surface of sleeve 1033 rather than the wall of the pipe. This has little practical effect. The thermal contact between the wall of pipe 1032 and the surface of bore 1090 of sleeve 1033 may be improved, if desired, by brazing, soldering or the like to provide a metallurgical bond. Similarly, the tips of vanes 1001 may be bonded to the inner surface of sleeve 1022.

Other embodiments of the invention will be apparent to those skilled in the art. For example, the helical tubes wound about and thermally coupled to the heat pipe may be in the form of tubular pipes bonded to the outer surface of the pipe rather than in the form of fins in the region between a cylindrical outer housing and the pipe surface, as illustrated in FIG. 2, whereupon no outer housing such as 222 is needed. While the capillary pumped loop has been illustrated and discussed as including a single evaporator such as 12 and a single heat exchanger 70 of FIG. 1, greater heat flow may be accommodated by the use of multiple, parallel-connected evaporators or heat exchangers. Other coolant fluids, such as acetone, dichlorodifluoromethane (Freon), or methanol, may be used instead of ammonia. Fins or vanes such as 201 of FIGS. 2a and 2b may be metallurgically or otherwise bonded to the adjacent pipe wall such as 232 and/or condenser outer housing such as 222, or they may merely be a close fit. In principle, it would be desirable to form the fins or vanes as a monolithic whole together with the wall (232) of the pipe and/or housing 222, but the machining or forming process is difficult.

I claim:

1. A heat transfer arrangement, comprising:
   an elongated porous pipe including an elongated bore and a cylindrical outer surface centered on an axis, said bore being closed off near a first end of said pipe and open at a second end of said pipe;
   a thermally conductive housing surrounding said porous pipe, said housing including an inner surface defining inwardly-directed protruding portions and first channels for the flow of fluid about said protrusions, said housing also including a cylindrical outer surface, said housing being dimensioned so that the innermost ends of said protrusions bear against said outer surface of said porous pipe;
   a plurality of second channels helically disposed about and in thermal contact with said outer surface of said housing, each of said second channels being dimensioned so that the surface tension forces acting on a heat transfer liquid therein are of the same order of magnitude as the gravitational forces when said heat transfer arrangement is in a one-G environment;
   a first plenum coupled to said first end of said second channels and adapted for coupling heat transfer vapor thereto for transferring heat to said housing and thereby condensing said heat transfer vapor into said heat transfer liquid;
   a second plenum coupled to said second end of said second channels and adapted for collecting said heat transfer liquid for return to a source of heat;
   coupling means adapted for coupling a source of working liquid to said bore at said second end of said pipe, whereby said liquid perfuses said porous pipe and said heat transferred to said housing is coupled by said protrusions to vaporize said working liquid, to produce working vapor which flows into said first channels; and
   a third plenum coupled to said first channels for collecting said working vapor for return to a condenser.

2. The combination of claim 1 wherein said plurality of passages are of a sufficiently small diameter that helical circulation along the walls is primarily due to surface tension and secondary flow effects.

3. The combination of claim 2 wherein the diameter of said passages is on the order of 1/10th of an inch.

4. A heat exchanger adapted for testing in a 1 G gravity environment and operation in a microgravity environment, comprising:
   an elongated thermally conductive pipe including an elongated cylindrical outer surface and an inner surface defining inwardly directed projections and vapor channels extending about said projections;
   an elongated porous sleeve located within said pipe, said porous sleeve including an outer surface in thermal contact with ends of said projections;
   coupling means associated with said porous sleeve and adapted to be coupled to a source of working fluid in liquid form for causing said working fluid in liquid form to perfuse the pores of said porous sleeve;
   a plenum coupled to said vapor channels for collecting working fluid in vapor form;
   an elongated heat pipe including a portion adapted to be coupled to a heat-rejecting device for rejecting heat, and also including an elongated cylindrical portion adapted for receiving heat which is to be rejected;
   a source of a flow of second fluid which when heat-laden is to be cooled;
   a plurality of channels helically disposed about and thermally coupled to said elongated cylindrical portion of said heat pipe, said plurality of channels being adapted for receiving said second fluid, said channels being wetted by said liquid form of said second fluid and having cross-sectional dimensions selected so that the surface tension forces of said liquid form of said second fluid are predominant relative to the gravitational forces on said second fluid in a reference gravity environment, and the helix dimensions being selected so that centrifugal forces resulting from the flow of said liquid form of said second fluid through said helical channels are at least significant relative to said gravitational forces in said reference gravity environment, whereby heat is transferred from said second fluid in said channels to said pipe and from said pipe to said working liquid which evaporates from said porous sleeve and enters said vapor channels in much the same manner in a microgravity environment as in a gravity environment, and testing can therefore take place in a gravity environment, and operation can take place in a microgravity environment.

5. A heat exchanger according to claim 4 wherein said coupling means comprises an elongated bore through at least a portion of said sleeve, said bore being adapted to be coupled to a source of said working fluid in liquid form.

6. A heat exchanger according to claim 4 wherein said bore is closed off at one end of said porous sleeve.

7. A heat exchanger according to claim 4 wherein both said working fluid and said second fluid are ammonia.

8. A heat exchanger according to claim 7 wherein said cross-section dimensions are about 1/10 inch (2.5 mm).

9. An exchanger according to claim 8 wherein the pressure drop across said plurality of channels is less than about 0.04 PSI (280 N/m$^2$).

10. An exchanger according to claim 8 wherein said helically disposed channels have an average diameter of approximately 0.8 inch for a linear flow rate within each of said channels of about 0.25 lbm/hour.

11. A heat exchanger for a first spacecraft module including a heat rejection arrangement, adapted for rejecting heat received from a first pipe in the form of heat-laden first vapor for condensing said vapor to a first liquid which is returned by way of a second pipe, which first spacecraft module is adapted to be mated to a second spacecraft module which includes a capillary pumped loop for absorbing heat from a source and for transferring the heat to a working liquid received over a third pipe to generate heat-laden of said working liquid vapor in a fourth pipe, said heat exchanger comprising:

a porous sleeve defining a cylindrical outer surface and also defining a central bore closed at a first end and open at a second end, said second end being adapted for receiving liquid working fluid from said radiator by way of said third pipe, whereby said liquid working fluid permeates said sleeve;

a thermally conductive elongated fifth pipe including a cylindrical outer surface centered on an axis and an inner surface defining protuberances projecting toward said axis and also defining vapor channels about said protuberances, said protuberances bearing against said outer surface of said sleeve, said vapor channels being closed in a region near said second end of said sleeve and open near said first end of said sleeve; and a plurality of passages helically arranged about, and in thermal contact with, said outer surface of said fifth pipe, said passages being connected to a common first junction near said first end of said sleeve, and connected to a common second junction near said second end of said sleeve, said first junction being adapted to be coupled to said first pipe for receiving said heat-laden first vapor therefrom for coupling said first vapor into said plurality of passages for condensing said first vapor into said first liquid by transferring heat to said fifth pipe, said second junction being adapted for collecting said first liquid and for coupling said first liquid to said second pipe, whereby said heat transferred to said fifth pipe causes said liquid permeating said porous sleeve to change to vapor and to flow in said vapor channels to said fourth pipe.

* * * * *